United States Patent
Woo et al.

(10) Patent No.: US 10,473,000 B2
(45) Date of Patent: Nov. 12, 2019

(54) MULTIPLE VARIABLE VALVE LIFT APPARATUS

(71) Applicants: Hyundai Motor Company, Seoul (KR); Kia Motors Corporation, Seoul (KR)

(72) Inventors: Soo Hyung Woo, Gyeonggi-do (KR); Heechang Oh, Gyeonggi-do (KR); Seung Kook Han, Gyeonggi-do (KR); Ju Hun Lee, Gyeonggi-do (KR); Wootae Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 28 days.

(21) Appl. No.: 15/834,755

(22) Filed: Dec. 7, 2017

(65) Prior Publication Data
US 2019/0072010 A1 Mar. 7, 2019

(30) Foreign Application Priority Data
Sep. 7, 2017 (KR) .......................... 10-2017-0114241

(51) Int. Cl.
| | |
|---|---|
| *F01L 1/34* | (2006.01) |
| *F01L 1/344* | (2006.01) |
| *F02D 13/02* | (2006.01) |
| *F01L 13/00* | (2006.01) |
| *F01L 1/047* | (2006.01) |
| *F01L 1/053* | (2006.01) |
| *F01L 1/08* | (2006.01) |
| *F01L 1/18* | (2006.01) |

(52) U.S. Cl.
CPC ....... *F01L 1/34413* (2013.01); *F01L 13/0036* (2013.01); *F02D 13/0211* (2013.01); *F02D 13/0261* (2013.01); *F01L 1/053* (2013.01); *F01L 1/08* (2013.01); *F01L 1/185* (2013.01); *F01L 2001/0473* (2013.01); *F01L 2013/0052* (2013.01); *F01L 2013/101* (2013.01); *F01L 2105/00* (2013.01); *F01L 2201/00* (2013.01); *F02D 13/0215* (2013.01)

(58) Field of Classification Search
CPC . F01L 1/34413; F01L 2001/0473; F01L 1/08; F01L 2013/0052; F02D 13/0211
USPC ............ 123/90.18, 90.6, 90.15, 90.16, 90.17
See application file for complete search history.

(56) References Cited

U.S. PATENT DOCUMENTS 9,869,253 B2 * 1/2018 Choi ....................... F01L 1/053
123/90.18

FOREIGN PATENT DOCUMENTS

| JP | 4924353 B2 | 4/2012 |
|---|---|---|
| JP | 5525317 B2 | 6/2014 |
| KR | 10-1030394 B1 | 4/2011 |

* cited by examiner

*Primary Examiner* — Ching Chang
(74) *Attorney, Agent, or Firm* — Mintz Levin Cohn Ferris Glovsky and Popeo, P.C.; Peter F. Corless (57) ABSTRACT

A multiple variable valve lift apparatus disposed at an intake part and an exhaust part of an engine includes: a moving cam rotating together with a camshaft, being movably disposed in an axial direction of the camshaft, and forming a plurality of cams for realizing valve lift to be different from each other and a cam guide protrusion; an operating unit selectively guiding the cam guide protrusion so as to move the moving cam in an axial direction of the camshaft; a controller controlling an operation of the operating unit; and a valve opening/closing unit opened/closed by contacting any one among the plurality of cams.

9 Claims, 10 Drawing Sheets

MULTIPLE VARIABLE VALVE LIFT APPARATUS

CROSS-REFERENCE TO RELATED APPLICATION

This application claims under 35 U.S.C. § 119(a) the benefit of Korean Patent Application No. 10-2017-0114241 filed in the Korean Intellectual Property Office on Sep. 7, 2017, the entire contents of which are incorporated herein by reference.

BACKGROUND

(a) Technical Field

The present disclosure relates to a multiple variable valve lift apparatus, more particularly, to a multiple variable valve lift apparatus capable of realizing multiple valve lift by a simple structure.

(b) Description of the Related Art

Generally, an internal combustion engine receives fuel and air into a combustion chamber and generates power by combusting the fuel and air. An intake valve is operated by drive of a camshaft, and air flows into the combustion chamber while the intake valve is open. In addition, an exhaust valve is operated by drive of a camshaft, and air is exhausted from the combustion chamber while the exhaust valve is open.

Optimal operation of the intake valve/exhaust valve, however, depends on an RPM of the engine. That is, an appropriate time for lifting or opening/closing the valves depends on the RPM of the engine. In order to implement an appropriate valve operation in accordance with the RPM of the engine, as described above, a VVL (Variable Valve Lift) apparatus that operates valves at different lifts in accordance with the RPM of an engine has been studied.

However, expansion of an operation area, accurate combustion control, reduction of NOx, combustion noise improvement, and so on may be not satisfied by varying valve lift depending on only using an ordinary variable valve lift apparatus in an engine having a type of homogeneous mixture compression ignition.

The above information disclosed in this Background section is only for enhancement of understanding of the background of the disclosure and therefore it may contain information that does not form the prior art that is already known in this country to a person of ordinary skill in the art.

SUMMARY

The present disclosure provides a multiple variable valve lift apparatus having advantages of satisfying expansion of an operation area, accurate combustion control, reduction of NOx, combustion noise improvement, and so on by a simple structure.

A multiple variable valve lift apparatus according to an exemplary embodiment of the present disclosure may be disposed at an intake part and an exhaust part of an engine.

The multiple variable valve lift apparatus may include: a moving cam rotating together with a camshaft, being movably disposed in an axial direction of the camshaft, and forming a plurality of cams for realizing valve lift to be different from each other and a cam guide protrusion; an operating unit selectively guiding the cam guide protrusion so as to move the moving cam in an axial direction of the camshaft; a controller controlling an operation of the operating unit; and a valve opening/closing unit opened/closed by contacting any one among the plurality of cams.

A plurality of cams of the intake part may include: an intake part first cam disposed so as to have a phase for retarding open timing of an intake valve from a timing of completing exhaust; an intake part second cam disposed so as to have a phase for opening the intake valve after the timing of completing exhaust; and an intake part third cam disposed so as to have a phase for advancing open timing of the intake valve from the timing of completing exhaust.

The operating unit may include a solenoid operated by the controller and a guide part, in which the cam guide protrusion is inserted, selectively protruded depending on an operation of the solenoid so as to guide the cam guide protrusion.

The intake part first, second, and third cams may have a lobe formed in an equal shape.

A plurality of cams of the exhaust part may include: an exhaust part first cam having a lobe realizing an equal lift with the intake part first cam; an exhaust part second cam having a high lobe for realizing high valve lift in comparison with the lobe of the exhaust part first cam and a sub-lobe for opening/closing an exhaust valve during opening of the intake valve; and n exhaust part third cam having an extension lobe for opening/closing the exhaust valve such that a time of opening the exhaust valve is long in comparison with the lobe of the exhaust part first cam and the high lobe of the exhaust part second cam.

The sub-lobe may open/close the exhaust valve as low lift in comparison with lift of the intake valve by the lobe of the intake part second cam.

The extension lobe may open/close the exhaust valve as high lift in comparison with lift of the intake valve by the lobe of the intake part third cam.

The exhaust part first cam may be contacted with the valve opening/closing unit of the exhaust part when the intake part first cam is contacted with the valve opening/closing unit of the intake part, and a time difference may exist from closing the exhaust valve to opening the intake valve by the lobe of the intake part first cam.

The exhaust part second cam may be contacted with the valve opening/closing unit of the exhaust part when the intake part second cam is contacted with the valve opening/closing unit of the intake part, and a part of exhaust gas being exhausted during opening of the exhaust valve by the high lobe of the exhaust part second cam may be again inhaled when the exhaust valve is opened by the sub-lobe of the exhaust part second cam while the intake valve is opened by the normal lobe of the intake part second cam.

The exhaust part third cam may be contacted with the valve opening/closing unit of the exhaust part when the intake part third cam is contacted with the valve opening/closing unit of the intake part, and opening of the intake valve may be started by the lobe of the intake part third cam before completely closing the exhaust valve since opening of the exhaust valve is started by the extension lobe of the exhaust part third cam.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present disclosure will hereinafter be described in detail with reference to the accompanying drawings.

Figure 1:
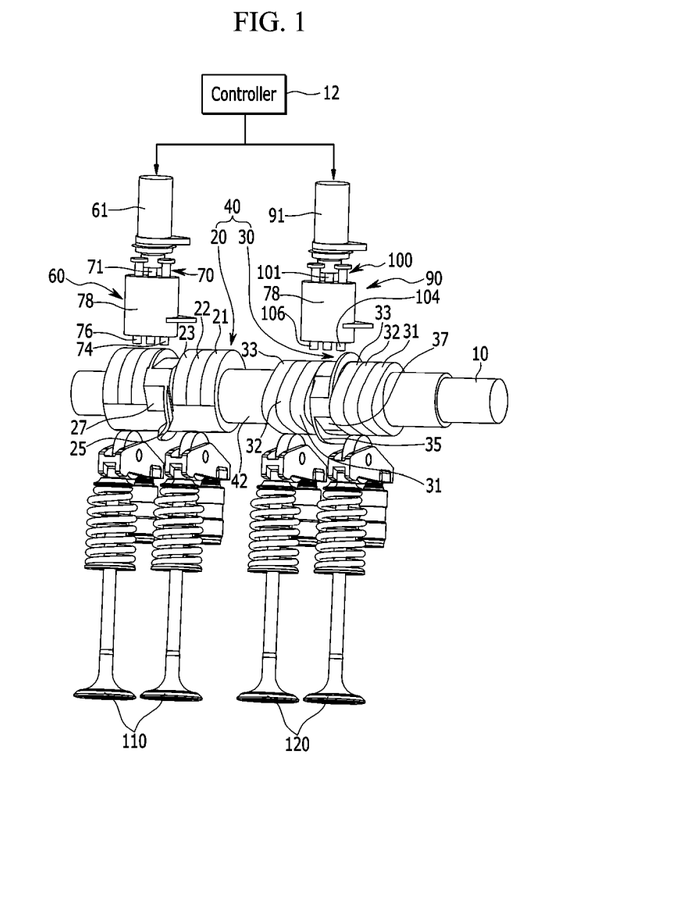
FIG. 1 is a perspective view of a multiple variable valve lift apparatus according to an exemplary embodiment of the present disclosure.

FIG. 1 is a perspective view of a multiple variable valve lift apparatus according to an exemplary embodiment of the present disclosure.

As shown in FIG. 1, a multiple variable valve lift apparatus according to an exemplary embodiment of the present disclosure includes a camshaft 10, a first moving cam 20 including a plurality of cams 21, 22, and 23 having different shapes, having a first cam guide protrusion 25, rotating together with the camshaft 10, and being slidable in an axial direction of the camshaft 10, a second moving cam 30 including a plurality of cams 31, 32, and 33 having different shapes, having a second cam guide protrusion 35, rotating together with the camshaft 10, and being slidable in the axial direction of the camshaft 10, a first operating unit 60 selectively jutting out to guide the first cam guide protrusion 25 to move the first moving cam 20 in a first direction, a second operating unit 90 selectively jutting out to guide the second cam guide protrusion 35 to move the second moving cam 30 in a second direction, a controller 12 configured to control operations of the first operating unit 60 and the second operating unit 90, and valve opening and closing units 110 and 120 brought into contact with any one of the plurality of cams 21, 22, 23, 31, 32, and 33 so as to be opened and closed.

It is illustrated that the first moving cam 20 and the second moving cam 30 include three cams 21, 22, and 23, and 31, 32, and 33, respectively, but the present disclosure is not limited thereto, and the first moving cam 20 and the second moving cam 30 may have various numbers of cams.

The first cam guide protrusion 25 and the second cam guide protrusion 35 are formed in the opposite directions in order to move the first moving cam 20 and the second moving cam 30 in the first direction and the second direction, respectively. For example, the first cam guide protrusion 25 may move the first moving cam 20 to the left in the drawing, and the second cam guide 35 may move the second moving cam 30 to the right.

The first and second operating units 60 and 90 include first and second solenoids 61 and 91 actuated under the control of the controller 12, and first and second guide parts 70 and 100 jutting out by the first and second solenoids 61 and 91 and allowing the first and second cam guide protrusions 25 and 35 to be inserted therein, respectively, in order to move the first and second moving cams 20 and 30.

The first and second operating units 60 and 90 further include a pin housing 78, respectively, the first and second guide parts 70 and 100 further include main pins 71 and 101 rotatably provided in the pin housing 78 and jutting out according to actuations of the first and second solenoids 61 and 91, and subordinate pins 74, 76, 104, and 106 rotatably provided in the pin housing 78 and engaged with the main pins 71 and 101 so as to jut out together with the main pins 71 and 101.

In FIG. 1, one main pin 71 and 101 and two subordinate pins 74, 76, 104, and 106 are provided at one pin housing 78, but the number of the main pins 71 and 101 and the subordinate pins 74, 76, 104, and 106 are not limited thereto, and the main pins 71 and 101 and the subordinate pins 74, 76, 104, and 106 may be provided in proportion to the number of the plurality of cams 21, 22, 23, 31, 32, and 33.

Sloped portions 27 and 37 may be formed in the first and second moving cams 20 and 30, respectively, to allow the first and second guide parts 70 and 100 to return to their original positions after the first and second moving cams 20 and 30 are moved.

The first moving cam 20 and the second moving cam 30 may be connected to integrally move, and the first moving cam 20 and the second moving cam 30 may be integrally formed as a single moving cam 40. That is, the first cam guide protrusion 25 and the second cam guide protrusion 35 may move the moving cam 40 in the first direction or the second direction. In addition, a journal portion 42 is formed in a cylinder shape having a uniform radius so as to connect the first moving cam 20 with the second moving cam 30.

When the main pins 71 and 101 and the subordinate pins 74, 76, 104, and 106 jut out so the first and second cam guide protrusions 25 and 35 are inserted between the main pins 71 and 101 and the subordinate pins 74, 76, 104, and 106, the first moving cam 20 and the second moving cam 30, or the moving cam 40, move in an axial direction of the camshaft 10, and the main pins 71 and 101 and the subordinate pins 74, 76, 104, and 106 may move along the sloped portions 27 and 37 so as to return to their original positions.

Figure 2:
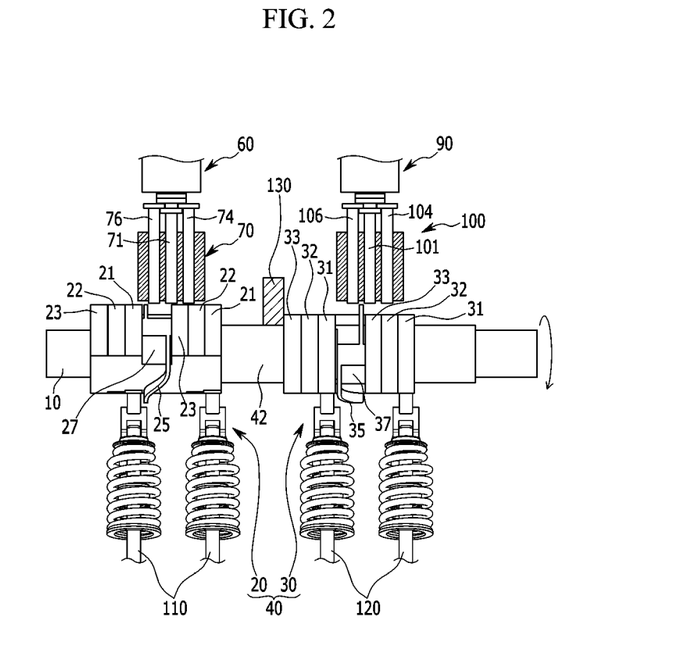
FIGS. 2 to 4 are operational views of a multiple variable valve lift apparatus according to an exemplary embodiment of the present disclosure.
Figure 3:
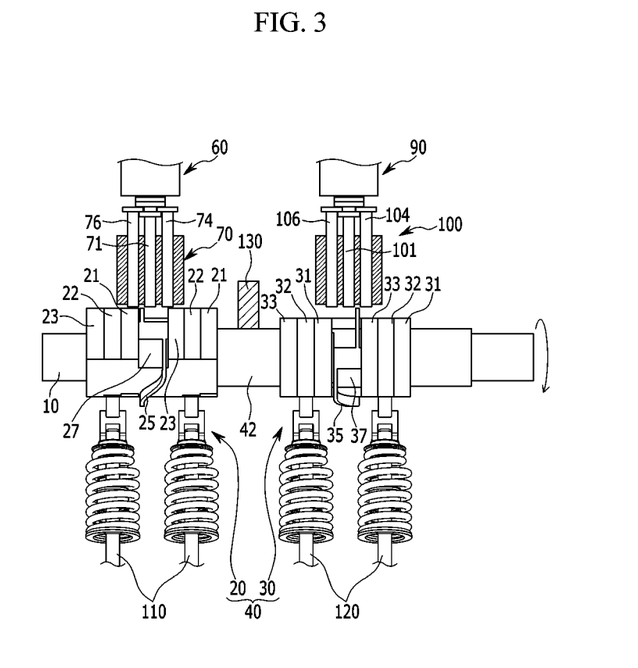
Figure 4:
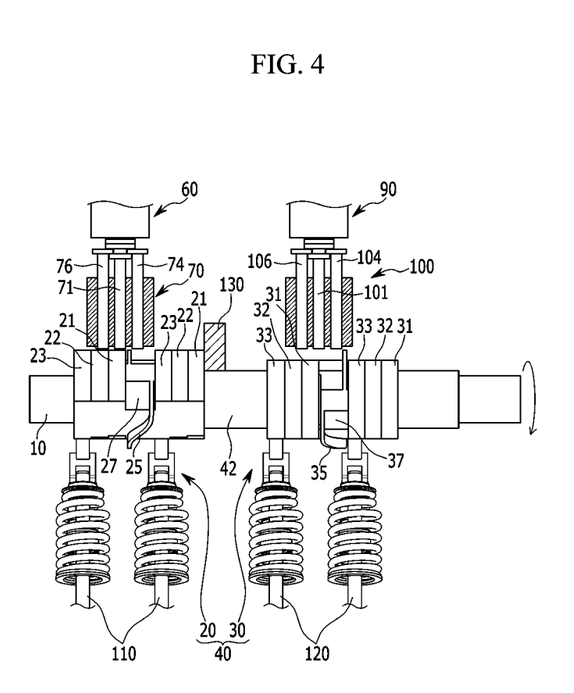

FIGS. 2 to 4 are operational views of a multiple variable valve lift apparatus according to an exemplary embodiment of the present disclosure.

As shown in FIG. 2, in a multiple variable valve lift apparatus according to an exemplary embodiment of the present disclosure, if a load of an engine is increased in a state that the valve opening/closing unit 110 and 120 opens/closes a valve by contacting a first cam 21 and 31 positioned at relative right side in a drawing among the cams, the controller 12 operates the second operating unit 90 such that the second guide part 100 is protruded. Then, the second cam guide protrusion 35 is guided in the state of being inserted between the main pin 101 and the left subordinate pin 106 of the second guide part 100. Then, the second moving cam 30 and the first moving cam 20 move toward the second direction which is to the right in the drawing, and as illustrated in FIG. 3, the valve opening and closing units 110 and 120 come into contact with the middle cams 22 and 32 among the cams so as to be opened and closed. Through this process, the valve lift is varied, and then the second guide part 100 returns to its original position by the sloped portion 37 formed in the second moving cam 30.

Meanwhile, when the valve opening/closing unit 110 and 120 is contacted with the first cam 21 and 31 among the cams (see FIG. 2), a right surface of a cam cap 130 disposed to surround an external circumference of the journal portion 42 for preventing that the camshaft 10 is escaped depending on rotation of the cam 21, 22, 23, 31, 32, and 33 is contacted to the second moving cam 30. Therefore, the moving cam 40 functioning to realize valve lift by the first cam 21 and 31 among the cams can be stably positioned and reliability of cam shift can be improved.

When a load of an engine is further increased in the state of FIG. 3, the controller 12 operates the second operating unit 90 and the second guide part 100 juts out. Then, the second cam guide protrusion 35 is guided in the state of being inserted between the main pin 101 and the right subordinate pin 104 of the second guide part 100. Then, the second moving cam 30 and the first moving cam 20 once more move toward the second direction which is to the right in the drawing, and as illustrated in FIG. 4, the valve opening and closing units 110 and 120 come into contact with the third cam 23 and 33 disposed the left in the drawing among the cams so as to be opened and closed. Through this process, the valve lift is varied and then the second guide part 100 returns to its original position by the sloped portion 37 formed in the second moving cam 30.

Meanwhile, when the valve opening/closing unit 110 and 120 is contacted with the third cam 23 and 33 among the cams (see FIG. 4), the right surface of the cam cap 130 is contacted to the first moving cam 20. Therefore, the moving cam 40 functioning to realize valve lift by the left cam 23 and 33 among the cams can be stably positioned and reliability of cam shift can be improved.

When a load of an engine is decreased in the state of FIG. 4, the controller 12 operates the first operating unit 60 and the first guide part 70 juts out. A change of the valve lift by a movement toward the first direction of the moving cam 40 depending on the jutting of the first guide part 70 is similar to the above described change of the valve lift by the movement toward the second direction of the moving cam 40 though the moving cam 40 is operated in a reverse moving direction, so a detailed description thereof will be omitted.

Hereinafter, lifts of a valve, which are realized by a multiple variable valve lift apparatus according to an exemplary embodiment of the present disclosure, will be described with referring to FIG. 5 to FIG. 10.

Meanwhile, the multiple variable valve lift apparatus according to an exemplary embodiment of the present disclosure may be respectively provided at an intake part and an exhaust part of an engine so as to vary lift of an intake valve and lift of an exhaust valve. In addition, an intake part is represented as "IN" and an exhaust part is represented as "EX" in FIG. 5 to FIG. 10.

Figure 5:
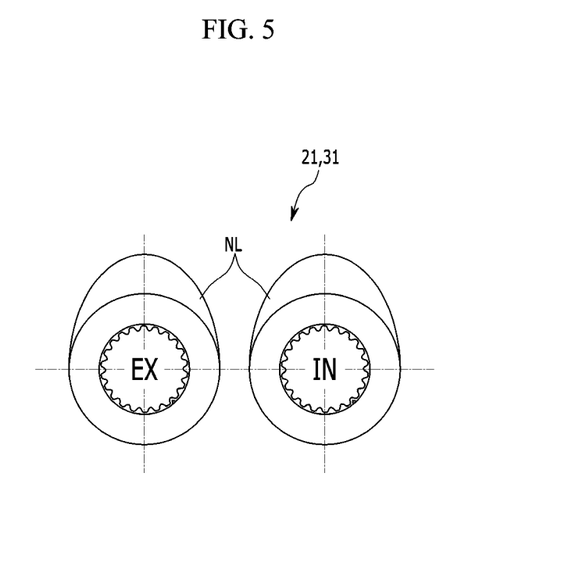
FIG. 5 is a drawing illustrating a shape of a first cam according to an exemplary embodiment of the present disclosure.
Figure 6:
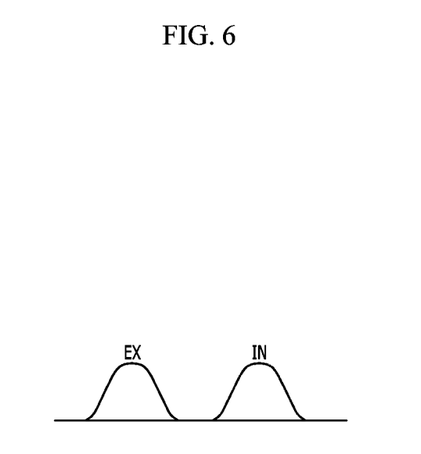
FIG. 6 is a drawing illustrating a profile of valve lift realized by a first cam according to an exemplary embodiment of the present disclosure.

FIG. 5 is a drawing illustrating a shape of a first cam according to an exemplary embodiment of the present disclosure, and FIG. 6 is a drawing illustrating a profile of valve lift realized by a first cam according to an exemplary embodiment of the present disclosure.

As shown in FIG. 5, the first cam 21 and 31 of the intake part and the first cam 21 and 31 of the exhaust part may be formed in a general cam shape so as to have a lobe formed in an equal shape. Herein, the lobe forming the general cam shape will be called "normal lobe NL". In addition, the first cam 21 and 31 of the intake part is disposed so as to have a phase for retarding open timing of a valve. That is, the intake part first cam 21 and 31 and the exhaust part first cam 21 and 31 are disposed such that opening of the intake valve is started by the normal lobe NL of the intake part first cam 21 and 31 after a set time passes from a timing of completely closing the exhaust valve since opening of the exhaust valve is started by the normal lobe NL of the exhaust part first cam 21 and 31. Thus, as shown in FIG. 6, in the state that the valve opening/closing units 110 and 120 of the intake part and exhaust part are contacted with the first cams 21 and 31 so as to open/close the valves (see FIG. 2), the underlap, whereby a set time difference exists from a timing of completely closing the exhaust valve to a timing of starting opening of the intake valve, is realized.

Figure 7:
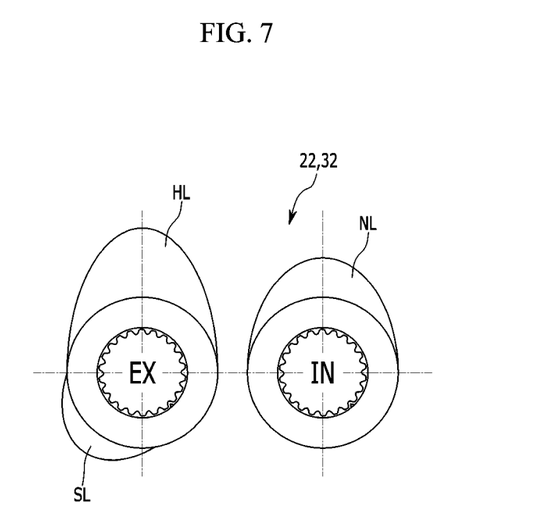
FIG. 7 is a drawing illustrating a shape of a second cam according to an exemplary embodiment of the present disclosure.
Figure 8:
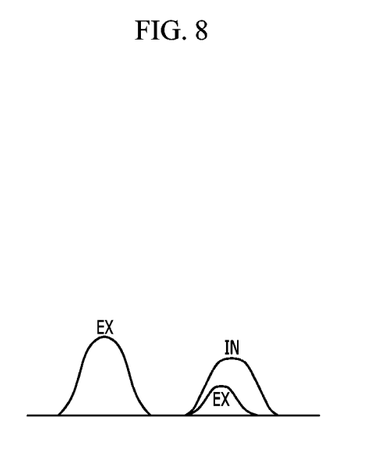
FIG. 8 is a drawing illustrating a profile of valve lift realized by a second cam according to an exemplary embodiment of the present disclosure.

FIG. 7 is a drawing illustrating a shape of a second cam according to an exemplary embodiment of the present disclosure, and FIG. 8 is a drawing illustrating a profile of valve lift realized by a second cam according to an exemplary embodiment of the present disclosure.

As shown in FIG. 7, the second cam 22 and 32 of the intake part has the normal lobe NL and the second cam 22 and 32 of the exhaust part has a high lobe HL for realizing high valve lift in comparison with the normal lobe NL. In this regard, the intake part second cam 22 and 32 and the exhaust part second cam 22 and 32 are disposed such that opening of the intake valve is started by the normal lobe NL of the intake part second cam 22 and 32 on timing of completely closing the exhaust valve since opening of the exhaust valve is started by the high lobe HL of the exhaust part second cam 22 and 32. In addition, a sub-lobe SL for opening/closing the exhaust valve as low lift in comparison with the normal lobe NL between timing of starting opening of the intake valve and timing of completely closing the intake valve by the lobe of the intake part second cam 22 and 32 is formed at the exhaust part second cam 22 and 32. Therefore, as shown in FIG. 8, in the state that the valve opening/closing units 110 and 120 of the intake part and exhaust part are contacted with the second cams 22 and 32 so as to open/close the valves (see FIG. 3), the rebreathing, whereby a part of exhaust gas being exhausted during opening of the exhaust valve by the high lobe HL of the exhaust part second cam 22 and 32 is again flowed into a combustion chamber when the exhaust valve is opened by the sub-lobe of the exhaust part second cam 22 and 32 while the intake valve is opened by the normal lobe NL of the intake part second cam 22 and 32, is realized. The rebreathing is also called "internal exhaust gas recirculation". Meanwhile, an amount of exhaust gas being exhausted depending on opening of the exhaust valve by the high lobe HL of the exhaust part second cam 22 and 32 may be larger than an amount of exhaust gas being exhausted depending on opening of the exhaust valve by the normal lobe NL of the exhaust part first cam 21 and 31.

Figure 9:
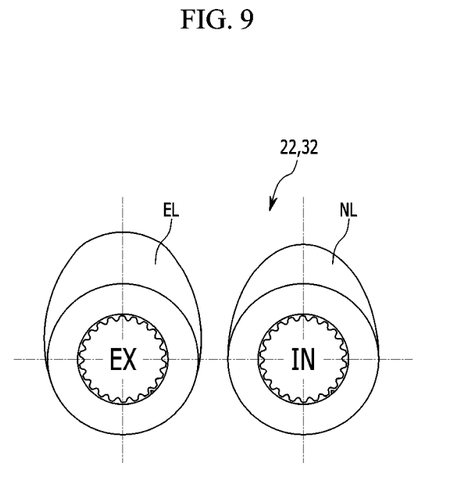
FIG. 9 is a drawing illustrating a shape of a third cam according to an exemplary embodiment of the present disclosure.
Figure 10:
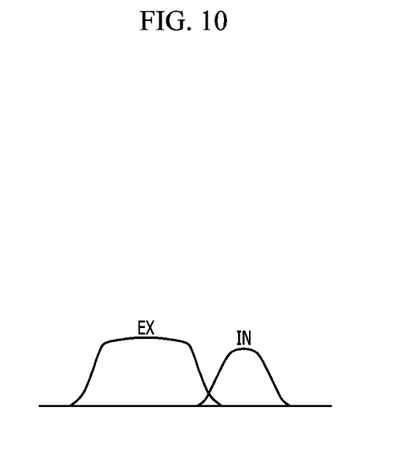
FIG. 10 is a drawing illustrating a profile of valve lift realized by a third cam according to an exemplary embodiment of the present disclosure.

FIG. 9 is a drawing illustrating a shape of a third cam according to an exemplary embodiment of the present disclosure, and FIG. 10 is a drawing illustrating a profile of valve lift realized by a third cam according to an exemplary embodiment of the present disclosure.

As shown in FIG. 9, the third cam 23 and 33 of the intake part has the normal lobe NL, and the third cam 23 and 33 of the exhaust part has an extension lobe EL for opening/closing the exhaust valve such that a time from starting opening of the exhaust valve to completely closing the exhaust valve is long in comparison with the normal lobe NL. In addition, the normal lobe NL of the intake part third cam 23 and 33 is disposed so as to have a phase for advancing open timing of a valve in comparison with the normal lobe NL of the intake part second cam 22 and 32, and the extension lobe EL of the exhaust part third cam 23 and 33 is disposed so as to have an equal phase with the high lobe HL of the exhaust part second cam 22 and 32. Thus, as shown in FIG. 10, in the state that the valve opening/closing units 110 and 120 of the intake part and exhaust part are contacted with the third cams 23 and 33 so as to open/close the valves (see FIG. 4), the long duration, whereby opening of the intake valve is started before completely closing the exhaust valve since opening of the exhaust valve is started, is realized. Meanwhile, the extension lobe EL of the exhaust part third cam 23 and 33 may realize high valve lift in comparison with the normal lobe of the intake part third cam 23 and 33.

According to an exemplary embodiment of the present disclosure, expansion of operation area, accurate combustion control, reduction of NOx, combustion noise improvement, and so on can be satisfied as the valve is operated by lift selected for respectively achieving the underlap, the rebreathing, and the long duration. Therefore, fuel consumption can be improved as efficiency of an engine is better.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A multiple variable valve lift apparatus, which is provided at an intake part and an exhaust part of an engine, comprising:
    a moving cam rotating together with a camshaft, being movably disposed in an axial direction of the camshaft, and forming a plurality of cams for realizing valve lift to be different from each other and a cam guide protrusion;
    an operating unit selectively guiding the cam guide protrusion so as to move the moving cam in an axial direction of the camshaft;
    a controller controlling an operation of the operating unit; and
    a valve opening/closing unit opened/closed by contacting one of the plurality of cams,
    wherein a plurality of cams of the intake part comprises:
    an intake part first cam disposed so as to have a phase for retarding open timing of an intake valve from a timing of completing exhaust;
    an intake part second cam disposed so as to have a phase for opening the intake valve after the timing of completing exhaust; and
    an intake part third cam disposed so as to have a phase for advancing open timing of the intake valve from the timing of completing exhaust.

2. The multiple variable valve lift apparatus of claim 1, wherein the operating unit comprises a solenoid operated by the controller and a guide part, in which the cam guide protrusion is inserted, selectively protruded depending on an operation of the solenoid so as to guide the cam guide protrusion.

3. The multiple variable valve lift apparatus of claim 1, wherein the intake part first, second, and third cams have a lobe formed in an equal shape.

4. The multiple variable valve lift apparatus of claim 1, wherein a plurality of cams of the exhaust part comprises:
    an exhaust part first cam having a lobe realizing an equal lift with the intake part first cam;
    an exhaust part second cam having a high lobe for realizing high valve lift in comparison with the lobe of the exhaust part first cam and a sub-lobe for opening/closing an exhaust valve during opening of the intake valve; and
    an exhaust part third cam having an extension lobe for opening/closing the exhaust valve such that a time of opening the exhaust valve is long in comparison with the lobe of the exhaust part first cam and the high lobe of the exhaust part second cam.

5. The multiple variable valve lift apparatus of claim 4, wherein the sub-lobe opens/closes the exhaust valve as low lift in comparison with lift of the intake valve by a lobe of the intake part second cam.

6. The multiple variable valve lift apparatus of claim 4, wherein the extension lobe opens/closes the exhaust valve as high lift in comparison with lift of the intake valve by a lobe of the intake part third cam.

7. The multiple variable valve lift apparatus of claim 4, wherein the exhaust part first cam is contacted with the valve opening/closing unit of the exhaust part when the intake part first cam is contacted with the valve opening/closing unit of the intake part, and a time difference exists from closing the exhaust valve to opening the intake valve by a lobe of the intake part first cam.

8. The multiple variable valve lift apparatus of claim 4, wherein the exhaust part second cam is contacted with the valve opening/closing unit of the exhaust part when the intake part second cam is contacted with the valve opening/closing unit of the intake part, and a part of exhaust gas being exhausted during opening of the exhaust valve by the high lobe of the exhaust part second cam is again inhaled when the exhaust valve is opened by the sub-lobe of the exhaust part second cam while the intake valve is opened by a lobe of the intake part second cam.

9. The multiple variable valve lift apparatus of claim 8, wherein the exhaust part third cam is contacted with the valve opening/closing unit of the exhaust part when the intake part third cam is contacted with the valve opening/closing unit of the intake part, and opening of the intake valve is started by a lobe of the intake part third cam before completely closing the exhaust valve since opening of the exhaust valve is started by the extension lobe of the exhaust part third cam.

\* \* \* \* \*